(12) United States Patent
Muramatsu

(10) Patent No.: US 8,085,315 B2
(45) Date of Patent: Dec. 27, 2011

(54) IMAGING APPARATUS FOR ENHANCING APPEARANCE OF IMAGE DATA

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 397 days.

(21) Appl. No.: 12/078,275

(22) Filed: Mar. 28, 2008

(65) Prior Publication Data

US 2009/0002521 A1 Jan. 1, 2009

(30) Foreign Application Priority Data

Apr. 3, 2007 (JP) ................................. 2007-097527

(51) Int. Cl.
 *H04N 5/235* (2006.01)
(52) U.S. Cl. .................... 348/229.1; 348/222.1; 348/364
(58) Field of Classification Search ............... 348/229.1, 348/222.1, 241, 362, 364
See application file for complete search history.

(56) References Cited

U.S. PATENT DOCUMENTS

| | | | |
|---|---|---|---|
| 5,517,333 A * | 5/1996 | Tamura et al. ................. 358/518 |
| 5,664,242 A | 9/1997 | Takagi |
| 5,909,598 A | 6/1999 | Kadohara |
| 5,991,456 A | 11/1999 | Rahman et al. |
| 6,433,838 B1 * | 8/2002 | Chen .............................. 348/674 |
| 7,650,068 B2 * | 1/2010 | Iwasaki .......................... 396/234 |
| 7,656,431 B2 * | 2/2010 | Serizawa et al. ............ 348/222.1 |
| 7,834,915 B2 * | 11/2010 | Wakazono et al. ......... 348/229.1 |
| 2002/0036697 A1 | 3/2002 | Mori et al. |
| 2002/0080247 A1 * | 6/2002 | Takahashi et al. ............ 348/229 |
| 2002/0191086 A1 * | 12/2002 | Masuyama ................ 348/229.1 |
| 2004/0066464 A1 * | 4/2004 | Ueyama ......................... 348/362 |
| 2004/0183924 A1 * | 9/2004 | Hannah ....................... 348/229.1 |
| 2005/0157189 A1 * | 7/2005 | Sambongi ..................... 348/241 |
| 2006/0067670 A1 | 3/2006 | Misawa |
| 2006/0083438 A1 | 4/2006 | Donomae et al. |
| 2006/0268149 A1 | 11/2006 | Teng |
| 2007/0097228 A1 * | 5/2007 | Kuniba ....................... 348/222.1 |
| 2009/0273675 A1 * | 11/2009 | Jonsson ......................... 348/164 |

FOREIGN PATENT DOCUMENTS

| | | |
|---|---|---|
| JP | A-3-152518 | 6/1991 |
| JP | A-7-23287 | 1/1995 |
| JP | A-8-110564 | 4/1995 |
| JP | A-2002-084455 | 3/2002 |

OTHER PUBLICATIONS

European Office Action issued on May 7, 2010 in European Patent Application No. 08 251 248.4.
Aug. 16, 2011 Office Action issued in Japanese Patent Application No. 2007-097527 (with translation).

* cited by examiner

*Primary Examiner* — Tuan Ho
*Assistant Examiner* — Kent Wang
(74) *Attorney, Agent, or Firm* — Oliff & Berridge, PLC

(57) ABSTRACT

An imaging apparatus includes a photometry section, an exposure calculating section, an imaging section, and an image processing section. The photometry section performs the photometry of a subject. The exposure calculating section sets exposure conditions based on a photometry result of the photometry section. The imaging section images the subject in accordance with the exposure conditions to generate image data. The image processing section is capable of performing the image correction to perform improvement of luminosity for the dark region, on the image data generated in the imaging section. In the above described configuration, the exposure calculating section determines exposure conditions according to correction setting of the image correction in the image processing section.

5 Claims, 7 Drawing Sheets

Fig. 7

| | IMPROVEMENT OF LUMINOSITY IN DARK REGION | REFLECTING PROPORTION k1 OF AVERAGE PHOTOMETRIC VALUE | REFLECTING PROPORTION k2 OF PHOTOMETRIC VALUE OF BRIGHT AREA | REFLECTING PROPORTION k3 OF PHOTOMETRIC VALUE OF CENTRAL AREA | PHOTOMETRIC OFFSET VALUE k4 |
|---|---|---|---|---|---|
| FOR AVERAGE PHOTOMETRIC VALUE BvMEAN>Bv4 | NONE | 0.3 | 0.2 | 0.5 | −0.5 |
| | WEAKER | 0.3 | 0.3 | 0.4 | −0.3 |
| | STRONGER | 0.2 | 0.5 | 0.3 | −0.1 |
| | AUTOMATIC | 0.3 | 0.4 | 0.3 | −0.2 |
| | IMPROVEMENT OF LUMINOSITY IN DARK REGION | REFLECTING PROPORTION k1 OF AVERAGE PHOTOMETRIC VALUE | REFLECTING PROPORTION k2 OF PHOTOMETRIC VALUE OF BRIGHT AREA | REFLECTING PROPORTION k3 OF PHOTOMETRIC VALUE OF CENTRAL AREA | PHOTOMETRIC OFFSET VALUE k4 |
| FOR AVERAGE PHOTOMETRIC VALUE BvMEAN≦Bv4 | NONE | 0.5 | 0 | 0.5 | 0 |
| | WEAKER | 0.5 | 0.1 | 0.4 | 0 |
| | STRONGER | 0.5 | 0.2 | 0.3 | 0 |
| | AUTOMATIC | 0.5 | 0.2 | 0.3 | 0 |

IMAGING APPARATUS FOR ENHANCING APPEARANCE OF IMAGE DATA

CROSS REFERENCE TO RELATED APPLICATION

This application is based upon and claims the benefit of priority from Japanese Patent Application No. 2007-097527, filed on Apr. 3, 2007, the entire contents of which is incorporated herein by reference.

BACKGROUND

1. Field

The present embodiments relate to an imaging apparatus.

2. Description of the Related Art

There is known a conventional imaging apparatus which converts a captured image in accordance with below formula of the gamma conversion.

$$Y = aX^\gamma + b \quad [1]$$

where X is a pixel value of the captured image, Y is a pixel value after conversion, a, b are constant numbers, $\gamma$ is a gamma value determining gamma characteristic, and "^" is an exponentiation operator.

In the patent document 1 (Japanese Unexamined Patent Application Publication No. 2002-84455), there is disclosed a technology for keeping the average brightness of the image after the gamma conversion by changing exposure conditions of the imaging apparatus in accordance with switching of the gamma value.

Meanwhile, like D-Lighting (registered trademark), there is known a technology of image correction that selectively makes a dark region of image data bright. This kind of image correction is different processing performed separately from the above described gamma conversion.

SUMMARY

The present embodiments provide a technology adaptively enhancing appearance of image data in addition to image correction that makes the dark region bright.

An imaging apparatus includes a photometry section, an exposure calculating section, an imaging section, and an image processing section. The photometry section performs the photometry of a subject. The exposure calculating section sets exposure conditions based on a photometry result of the photometry section. The imaging section images the subject in accordance with the exposure conditions to generate image data. The image processing section is capable of performing the image correction to perform improvement of luminosity for the dark region, on the image data generated in the imaging section. In the above described configuration, the exposure calculating section determines exposure conditions according to correction setting of the image correction in the image processing section.

Meanwhile, for instance, the exposure calculating section, for a correction setting to perform the improvement of luminosity for the dark region, sets the exposure conditions low, compared with a case of the correction setting not to perform the improvement of luminosity.

In addition, the photometry section divides the subject into a plurality of parts and performs divisional photometry. The exposure calculating section, for a correction setting to perform improvement in luminosity for the dark region, sets the exposure conditions while rising reflecting proportion of photometry value of a bright place among the photometry values, compared with a case of correction setting where the improvement in luminosity is not performed.

Meanwhile, for instance, the exposure calculation section sets the exposure conditions lower, as the correction setting has large amount of improvement in luminosity of the dark region.

In addition, for instance, the photometry section divides the subject into a plurality of parts and performs divisional photometry. The exposure calculating section sets the exposure conditions by increasing a reflecting proportion of a photometry value of a bright part among the values of divisional photometry as the correction setting has large amount of improvement in luminosity of the dark region.

BRIEF DESCRIPTION OF THE DRAWINGS

FIG. 7 illustrates a diagram of one example of a setting table of k1 to k4.

DETAILED DESCRIPTION OF THE EMBODIMENTS (Configuration Description of Imaging Apparatus 11)

Figure 1:
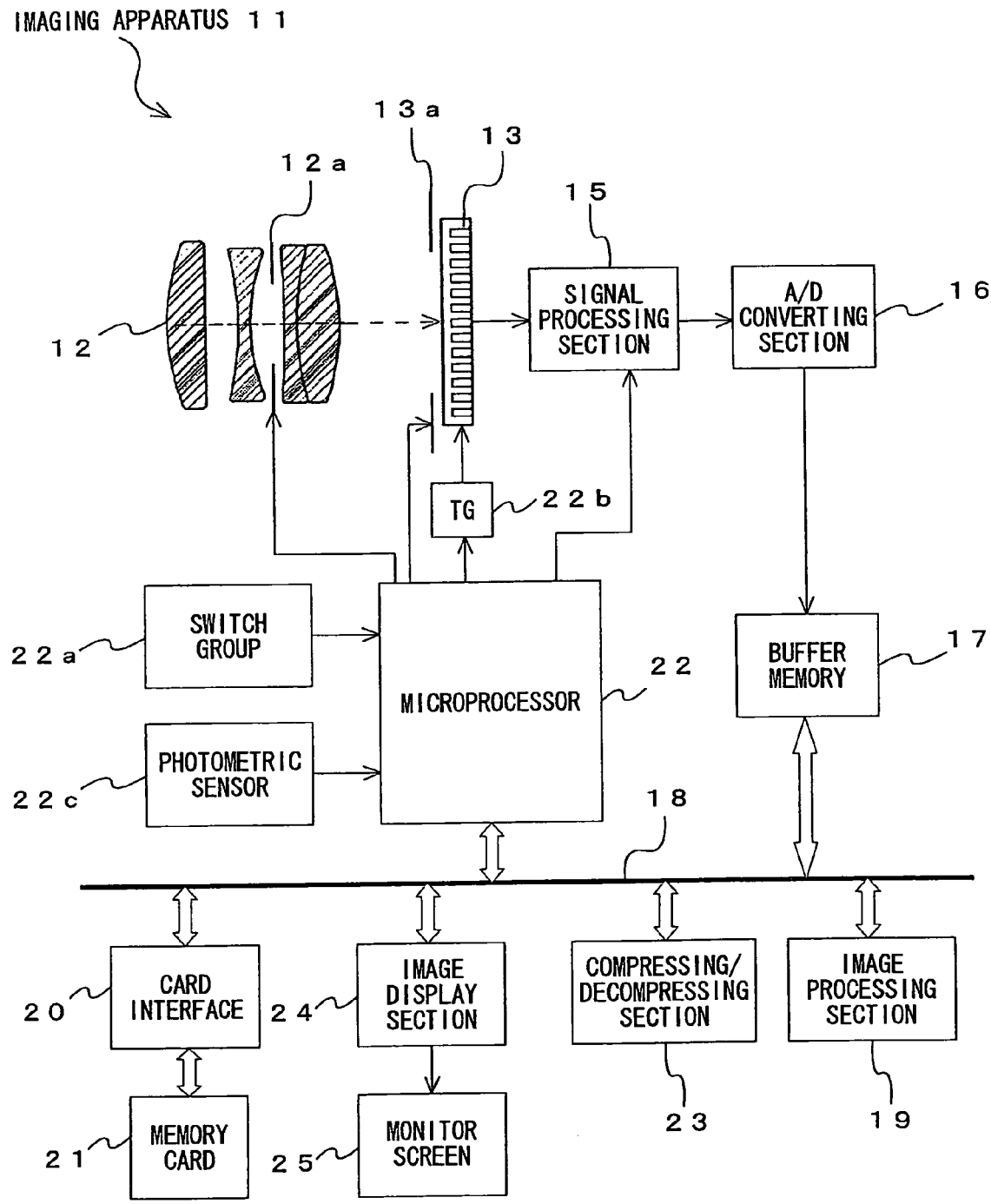
FIG. 1 illustrates a block diagram of a configuration of an imaging apparatus 11.

FIG. 1 illustrates a configuration of an imaging apparatus 11.

In FIG. 1, an imaging apparatus 11 is mounted with a shooting lens 12. The shooting lens 12 is provided with an aperture 12a. In an image space of this shooting lens 12, a shutter 13a and an image sensor 13 are arranged. An operation of this image sensor 13 is controlled by an output pulse of a timing generator 22b. Image data generated by the image sensor 13 is stored temporarily in a buffer memory 17 via a signal processing section 15 (including a gain adjusting section corresponding to an imaging sensitivity) and an A/D converting section 16. The buffer memory 17 is coupled with a bus 18. An image processing section 19, a card interface 20, a microprocessor 22, a compressing/decompressing section 23, and an image display section 24 are coupled with the bus 18. The card interface 20 records the image data into a detachable memory card 21. In addition, a switch group 22a of the imaging apparatus 11, the timing generator 22b, and a photometric sensor 22c are coupled with the microprocessor 22. Further, the microprocessor 22 performs control of the aperture 12a and the shutter 13a, too. In addition, the image display section 24 displays images and the like on a monitor screen 25 provided on a back of the imaging apparatus 11.

(Description of Imaging Operation)

Figure 2:
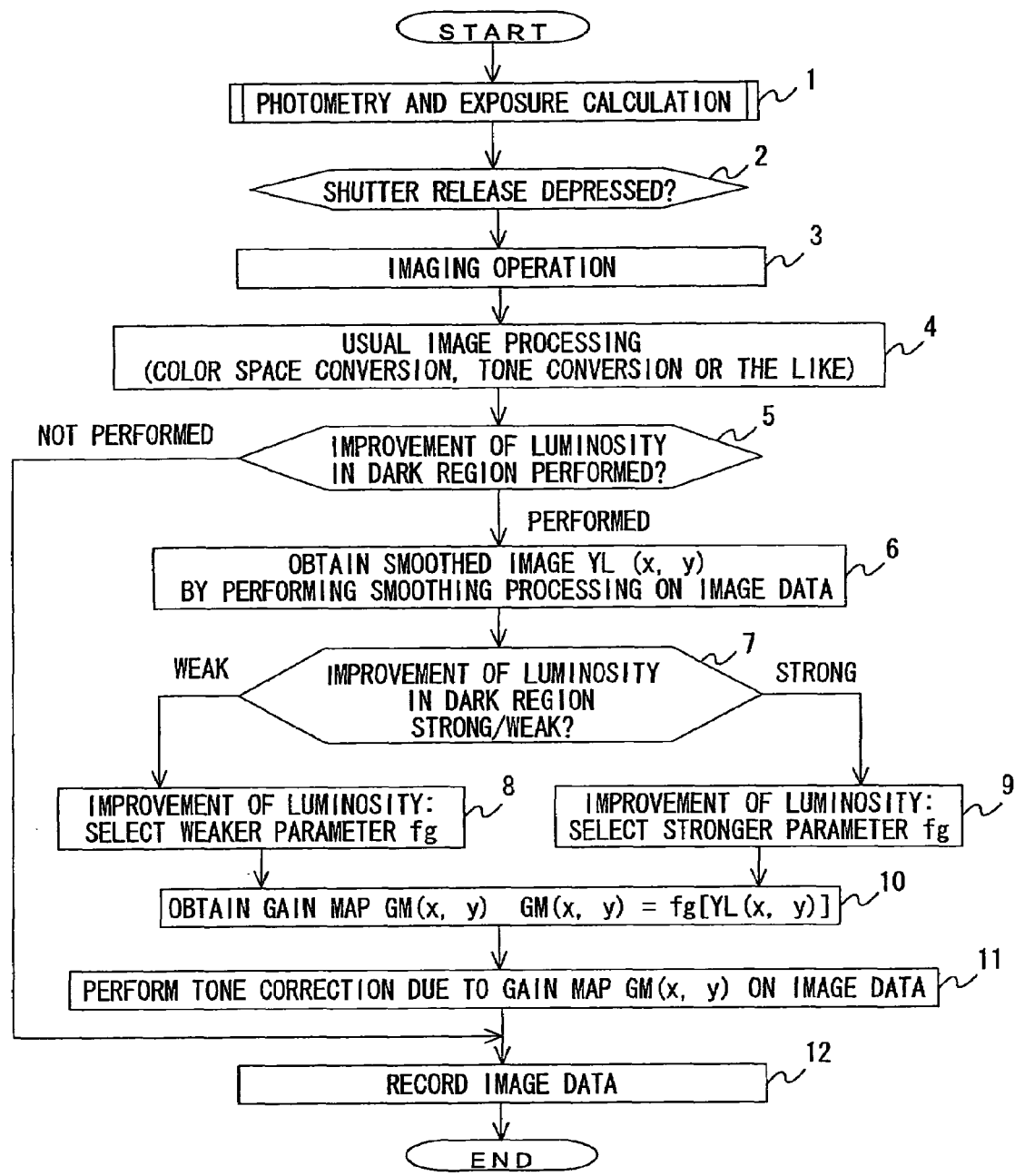
FIG. 2 illustrates a flowchart of an operation of the imaging apparatus 11.

FIG. 2 illustrates an operation of the imaging apparatus 11. There will be described this operation along a step number illustrated in FIG. 2 below.

Step 1: The microprocessor 22 performs the photometry and the exposure calculation, and determines the exposure conditions (an aperture value, a charge accumulating time, an imaging sensitivity, or the like) of the subject. This operation will be described in detail later.

Step 2: The microprocessor 22 detects depression of a shutter release by a user via the switch group 22a.

Here, when the depression of the shutter release is not detected, the microprocessor 22 returns the operation to Step 1.

On the other hand, when the depression of the shutter release is detected, the microprocessor 22 shifts the operation to Step 3.

Step 3: The microprocessor 22 drives the aperture 12a, the shutter 13a, the timing generator 22b or the like, and images the subject in accordance with the exposure conditions (aperture value, and charge accumulating time) set on Step 1. The signal processing section 15 amplifies image data by applying an imaging gain to meet the imaging sensitivity to the image data read from the image sensor 13. The amplified image data is A/D converted with an A/D converting section 16 and then recorded temporarily in the buffer memory 17.

Step 4: The image processing section 19 performs a usual image processing such as a tone conversion (gamma conversion) or a color space conversion on the image data within the buffer memory 17.

Step 5: The user can preliminarily set a reservation of an image correction to be performed on the image data by operating the switch group 22a. As one of the image corrections, like D-Lighting, there is prepared the image correction to perform the improvement of luminosity in the dark region. The microprocessor 22 determines whether or not to perform the improvement of luminosity in the dark region while referring to a correction setting data of the image correction.

Here, when the improvement of luminosity in the dark region is not performed, the microprocessor 22 shifts the operation to Step 12.

On the other hand, when performing the improvement of luminosity in the dark region, the microprocessor 22 shifts the operation to Step 6.

Step 6: The image processing section 19 performs smoothing processing according to below formula on a luminance component Y(x, y) of the image data to obtain a smoothed image YL(x, y).

$$YL(x, y) = \sum_{i=-r}^{r} \sum_{j=-r}^{r} Y(x+i, y+j) Lpw[(i^2+j^2)^{1/2}] \quad [2]$$

Figure 3:
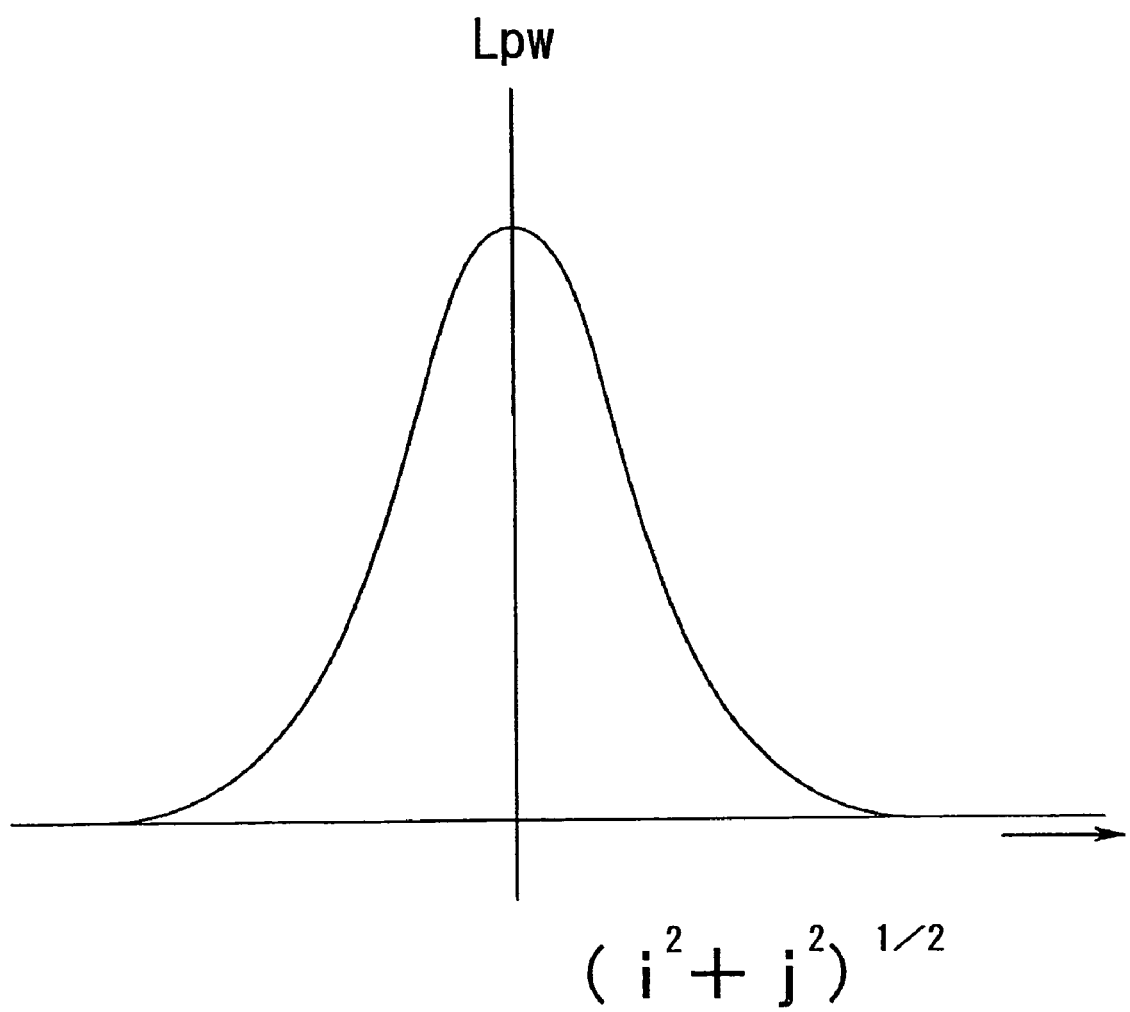
FIG. 3 illustrates a diagram of one example of a parameter Lpw.

In the above formula, (x, y) is coordinate values representing the position of a pixel to be processed. In the above formula, (i, j) is relative coordinate value of neighboring pixels reflecting on the smoothing processing. In the above formula, r is a radius value indicating selection range of the neighboring pixel. In the above formula, Lpw is a weighted ratio of the neighboring pixel as illustrated in FIG. 3. It is possible to know whether a pixel position (x, y) of the image data is located within bright region or dark region, from pixel values of the smoothed image YL(x, y) thus obtained.

Step 7: The microprocessor 22 determines in which of stronger mode or weaker mode the improvement of luminosity in the dark region is performed while referring to correction setting data of the image correction.

Here, when the improvement of luminosity in the dark region is performed in the weaker mode, the microprocessor 22 shifts the operation to Step 8.

On the other hand, when the improvement of luminosity in the dark region is performed in the stronger mode, the microprocessor 22 shifts the operation to Step 9.

Figure 4:
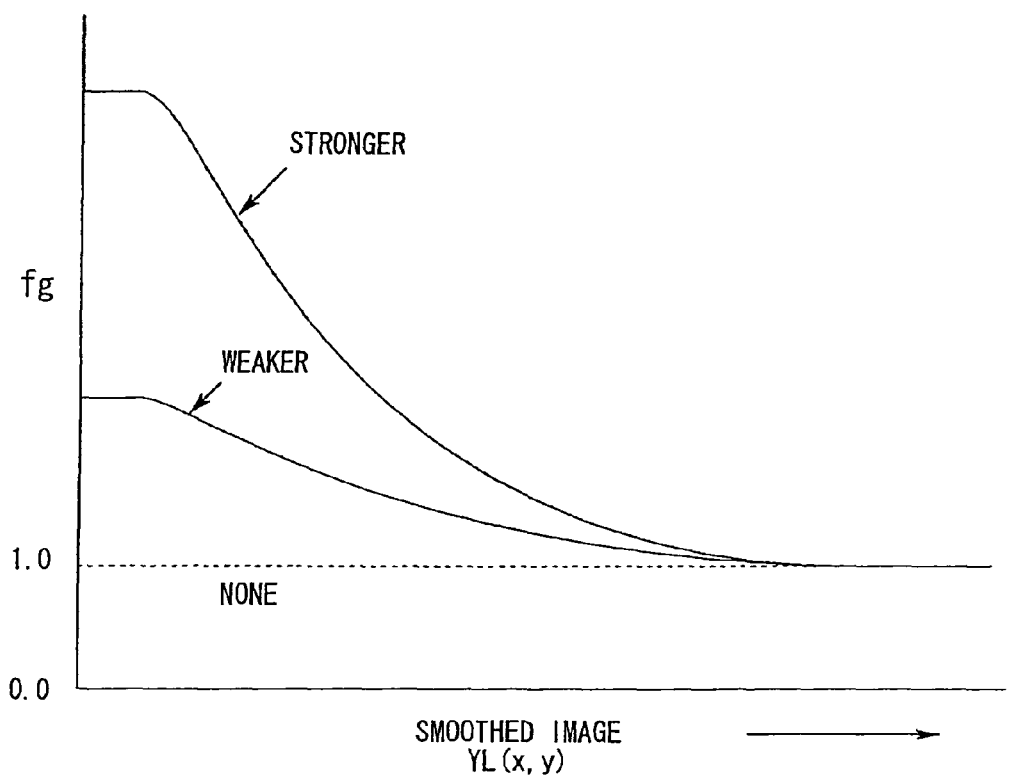
FIG. 4 illustrates a diagram of one example of a parameter fg[YL(x, y)]

Step 8: The microprocessor 22 selects a weaker parameter fg from two kinds of parameters fg as illustrated in FIG. 4, and sets it to the image processing section 19.

A value of this parameter fg is reduced monotonously, and approaches 1 as a neighbor region including the pixel position (x, y) of the image data becomes brighter (as a value of the smoothed image YL(x, y) becomes larger). Conversely, the value of the parameter fg becomes larger, as the neighbor region becomes darker (the value of the smoothed image YL(x, y) becomes smaller).

After setting this parameter fg, the microprocessor 22 shifts the operation to Step 10.

Step 9: The microprocessor 22 selects the stronger parameter fg from two kinds of parameters fg as illustrated in FIG. 4, and sets it to the image processing section 19.

The stronger parameter fg has larger value than the weaker parameter fg set in Step 8.

After setting the stronger parameter fg, the microprocessor 22 shifts the operation to Step 10.

Step 10: The Image processing section 19 substitutes a value of the smoothed image YL(x, y) obtained in Step 6 to the set parameter fg, and obtains a gain map GM(x, y).

$$GM(x, y) = fg[YL(x, y)] \quad [3]$$

Step 11: The image processing section 19 performs a tone correction due to the gain map GM(x, y) as below formulas on signal components RGB of the image data within the buffer memory 17, and obtains the image data Rc, Gc, Bc after tone correction.

$$Rc(x, y) = R(x, y) \cdot GM(x, y)$$

$$Gc(x, y) = G(x, y) \cdot GM(x, y)$$

$$Bc(x, y) = B(x, y) \cdot GM(x, y)$$

Based on such an image correction, the dark region of the image data is corrected brightly.

Step 12: The card interface 20 compresses and preserves the image data into the memory card 21.

(Description of Photometry and Exposure Calculation)

Figure 5:
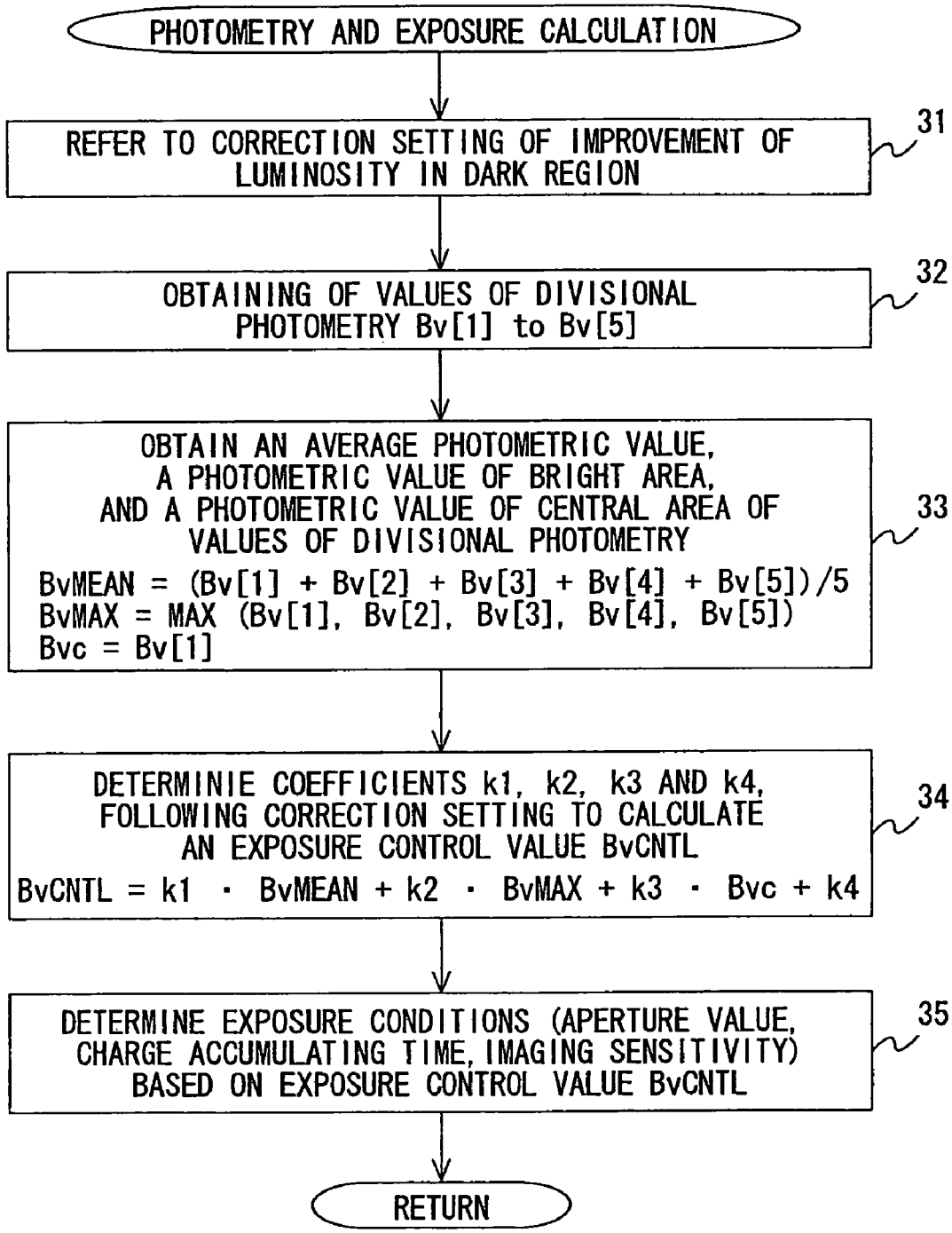
FIG. 5 illustrates a flowchart of an operation of a photometry and an exposure calculation.

FIG. 5 illustrates operations (photometry and exposure calculation) of Step 1 described above.

There will be described the operations along the step number illustrated in FIG. 5 below.

Step 31: The microprocessor 22 obtains the correction setting data with respect to the image correction (above described Steps 5 to 11) reserved and set to the image data after the imaging.

Step 32: A photometry sensor 22c divides the subject into five regions illustrated in FIG. 6 to perform photometry. The microprocessor 22 obtains five values of divisional photometry Bv[1] to Bv[5] as a result of the divisional photometry.

Figure 6:
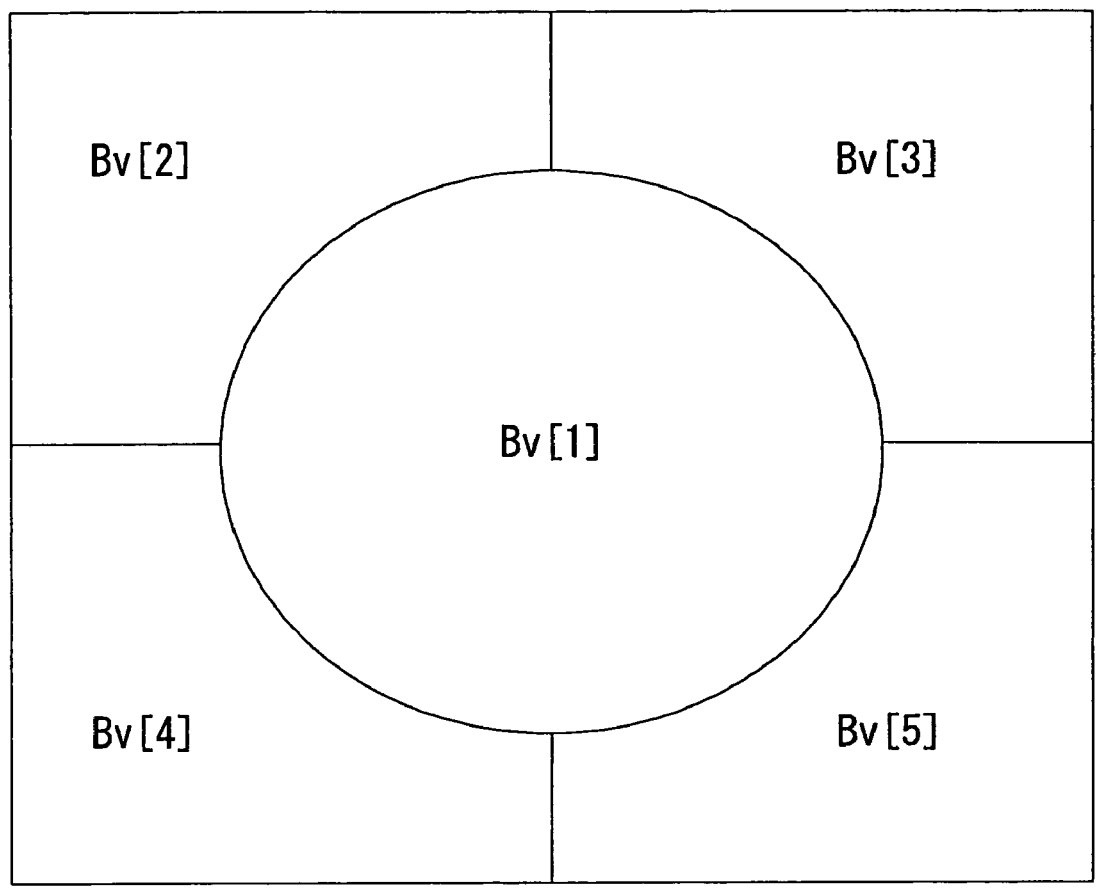
FIG. 6 illustrates a diagram of a division of subject of the divisional photometry.

Meanwhile, with respect to division of photometry, it is not limited to five divisions illustrated in FIG. 6. Practically, the division of photometry may be determined according to the specifications of a photometric sensor 22c.

Step 33: The microprocessor 22 substitutes the values of divisional photometry Bv[1] to Bv[5] into below formulas, and obtains an average photometric value $Bv_{MEAN}$, a photometric value of bright area $Bv_{MAX}$, and a photometric value of central area Bvc.

$$Bv_{MEAN} = (Bv[1] + Bv[2] + Bv[3] + Bv[4] + Bv[5])/5$$

$$Bv_{MAX} = \text{MAX}(Bv[1], Bv[2], Bv[3], Bv[4], Bv[5])$$

$$Bvc = Bv[1]$$

Step 34: The microprocessor 22 calculates an exposure control value $Bv_{CNTL}$ while substituting a value obtained with Step 33 into a formula [4].

$$Bv_{CNTL}=k1 \cdot Bv_{MEAN}+k2 \cdot Bv_{MAX}+k3 \cdot Bvc+k4 \quad [4]$$

where, the reflecting proportions k1 to k3 and the value of an offset value k4 within the formula [4] are determined so as to follow rules below described.

(1) When the improvement of luminosity in the dark region is performed on the image data after the imaging, the offset value k4 is made relatively large compared with a case where the improvement of luminosity in the dark region is not performed.

(2) When the improvement of luminosity in the dark region is performed on the image data after the imaging, the reflecting proportion k2 of the photometric value of bright area $Bv_{MAX}$ is made large compared with a case where the improvement of luminosity in the dark region is not performed.

(3) The larger is the improvement of luminosity in the dark region, the larger the offset value k4 is made.

(4) The larger is the improvement of luminosity in the dark region, the larger the reflecting proportion k2 of the photometric value of bright area $Bv_{MAX}$ is made.

(5) However, when the average photometric value $Bv_{MEAN}$ is low (for instance, not more than Bv4), the reflecting proportion k1 of the average photometric value $Bv_{MEAN}$ is raised, and the reflecting proportion k2 of the photometric value of bright area $Bv_{MAX}$ is reduced. Further, the offset value k4 is made zero.

FIG. 7 illustrates one example of the setting table of values k1 to k4 following these rules.

When such a setting table is designed, values k1 to k4 may be adjusted along the rules (1) to (5) so that the tone reproduction of the image data after the image correction becomes preferable in various photographing scene.

Step 35: The microprocessor 22 performs the known exposure calculation based on the exposure control value $Bv_{CNTL}$ calculated in Step 34 to determine the exposure conditions (the aperture value, the charge accumulating time, the imaging sensitivity, or the like). After the operation described above, the microprocessor 22 ends routines of the photometry and the exposure calculation, and returns the operation to Step 2 of a main routine (FIG. 2).

Effects of the Present Embodiments

In the present embodiments, when the improvement of luminosity in the dark region is performed on the image data after the imaging, the exposure condition at the time of the photographing is adaptively changed. As a result, it becomes possible to obtain the image data with preferable tone reproducibility by balancing the tone reproduction in the dark region due to the improvement of luminosity and the tone reproduction in the bright region due to the exposure conditions.

In particular, in the present embodiments, when the improvement of luminosity in the dark region after the imaging is not performed, the offset value k4 of the exposure control value $Bv_{CNTL}$ is reduced. In this case, the exposure control value $Bv_{CNTL}$ itself is lowered, and the exposure conditions at the time of photographing are complementarily increased. As a result, the image data are wholly imaged brightly; and thus it is possible to supplement insufficient tone of the dark region.

Conversely, when the improvement of luminosity in the dark region is performed, the offset value k4 of the exposure control value $Bv_{CNTL}$ becomes large. In this case, the exposure control value $Bv_{CNTL}$ itself increases, and the exposure conditions at the time of imaging complementarily become low. As a result, it is possible to improve insufficient tone (blown out or the like) of the bright region due to lower exposure conditions while performing the improvement of luminosity in the dark region by the image correction.

Further, in the present embodiments, when the improvement of luminosity in the dark region is not performed, the reflecting proportion k2 of the photometric value of bright area $Bv_{MAX}$ is made small. In this case, the exposure conditions are determined, while relatively emphasizing the dark region. As a result, the dark region of the image data is imaged brightly, and thus insufficient tone of the dark region can be supplemented.

Conversely, when the improvement of luminosity in the dark region is performed, the reflecting proportion k2 of the photometric value of bright area $Bv_{MAX}$ becomes large. In this case, the exposure conditions are determined while emphasizing the bright region. As a result, the insufficient tone (blown out or the like) of the bright region can be improved with the exposure conditions of emphasizing the bright region while performing the improvement of luminosity in the dark region by the image correction.

In addition, in the present embodiments, as an amount of the improvement in luminosity of the dark region becomes large, the exposure conditions are made low by changing the offset value k4. As a result, the stronger the improvement of luminosity in the dark region is performed, the lower the exposure conditions become, and accordingly, it is possible to further improve the insufficient tone (blown out or the like) of the bright region.

Further, in the present embodiments, as the amount of the improvement in luminosity of the dark region becomes large, the reflecting proportion k2 of the photometric value of bright area $Bv_{MAX}$ is made large. In this case, the exposure conditions are determined while further emphasizing the bright region. As a result, the stronger the improvement of luminosity in the dark region is made, the more it becomes the exposure conditions of emphasizing the bright region, and accordingly it is possible to further improve the insufficient tone (blown out or the like) of the bright region.

Supplemental Information of the Embodiments

Meanwhile, in the embodiments described above, the value of the exposure control value $Bv_{CNTL}$ is changed. However, for instance, a setting value of an exposure correction may be changed according to a correction setting relating to the improvement of luminosity in the dark region.

In addition, in the embodiments described above, as the photometric value of bright area, the maximum value of divisional photometry is used. However, for instance, as the photometric value of bright area, an average value of several upper parts of the value of divisional photometry may be used.

Further, in the embodiments described above, there is described about image correction using the parameter fg. However, it is not limited to this image correction. For instance, replacement to brightness improvement technology described in the specification of U.S. Pat. No. 5,991,456 may be possible.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus comprising:
   a photometry section that performs photometry of a subject;
   an exposure calculating section that sets exposure conditions based on results of the photometry of said photometry section;
   an imaging section that images said subject in accordance with said exposure conditions to generate image data;
   a smoothing processing section that performs smoothing processing on said image data generated in said imaging section and generates a smoothed image;
   a gain map generating section that generates a gain map according to luminance component of said smoothed image generated by said smoothing processing section, the gain map being derived from a gain amount added for each pixel; and
   an image processing section that performs an image correction to improve luminosity in a dark region by multiplying a gain to each pixel of said image data generated in said imaging section using said gain map generated in said gain map generating section,
   wherein said exposure calculating section determines said exposure conditions according to correction setting of said image correction in said image processing section.

2. The imaging apparatus according to claim 1, wherein said exposure calculating section sets said exposure conditions low for said correction setting that provides the improvement of luminosity in said dark region, compared with said correction setting that provides no improvement of luminosity in said dark region.

3. The imaging apparatus according to claim 1, wherein said photometry section divides said subject into a plurality of parts and performs divisional photometry; and
   said exposure calculating section sets said exposure conditions by raising reflecting proportion of a photometric value of a bright part among values of said divisional photometry, for said correction setting that provides the improvement of luminosity in said dark region, compared with said correction setting that provides no improvement of luminosity in said dark region.

4. The imaging apparatus according to claim 1, wherein said exposure calculating section sets said exposure conditions low as said correction setting has larger amount of improvement in luminosity of said dark region.

5. The imaging apparatus according to claim 1, wherein said photometry section divides said subject into a plurality of parts and perform divisional photometry; and
   said exposure calculating section sets said exposure conditions by raising the reflecting proportion of a photometric value of a bright part among values of said divisional photometry, as said correction setting has larger amount of improvement in luminosity of said dark region.

* * * * *